United States Patent [19]

Molison

[11] Patent Number: 4,558,802
[45] Date of Patent: Dec. 17, 1985

[54] CAROUSEL TYPE DISPENSER

[75] Inventor: Robert E. Molison, Hanover, Pa.

[73] Assignee: Elsner Engineering Works, Inc., Hanover, Pa.

[21] Appl. No.: 627,887

[22] Filed: Jul. 5, 1984

[51] Int. Cl.[4] .......................................... G07F 11/12
[52] U.S. Cl. .................................... 221/11; 221/104; 221/122; 221/222; 74/665 GE
[58] Field of Search .................. 221/11, 14, 221, 222, 221/103–105, 113, 133, 119–122, 9, 10; 474/125, 58; 74/665 GE

[56] References Cited

U.S. PATENT DOCUMENTS

| | | | |
|---|---|---|---|
| 2,072,840 | 3/1937 | Temple | 198/859 |
| 2,325,165 | 7/1943 | Goodwin | 221/104 |
| 2,433,736 | 12/1947 | Carew | 221/11 X |
| 2,497,718 | 2/1950 | Earley et al. | 221/11 X |
| 2,860,817 | 11/1958 | Bell | 221/122 X |
| 2,906,072 | 9/1959 | Carlson | 221/11 X |
| 2,925,196 | 2/1960 | Stoner | 221/222 |
| 3,283,951 | 11/1966 | Gladfelder | 221/11 |
| 3,621,828 | 11/1971 | Hansen | 221/11 X |
| 3,807,600 | 4/1974 | Moss et al. | 221/11 |
| 3,819,086 | 6/1974 | Paolucci | 221/11 |
| 3,937,360 | 2/1976 | Doucette | 221/11 |
| 4,351,452 | 9/1982 | Scalera et al. | 221/11 |

Primary Examiner—Joseph J. Rolla
Assistant Examiner—Kevin P. Shaver
Attorney, Agent, or Firm—Thomas Hooker

[57] ABSTRACT

A cap dispenser includes a carousel cap magazine holding a number of cap stacks and a cap delivery assembly for dispensing individual caps on demand. A drive assembly actuates the cap delivery assembly to dispense a cap and indexes the magazine when a low supply of caps are within the cap delivery assembly to supply cap stacks thereto.

8 Claims, 3 Drawing Figures

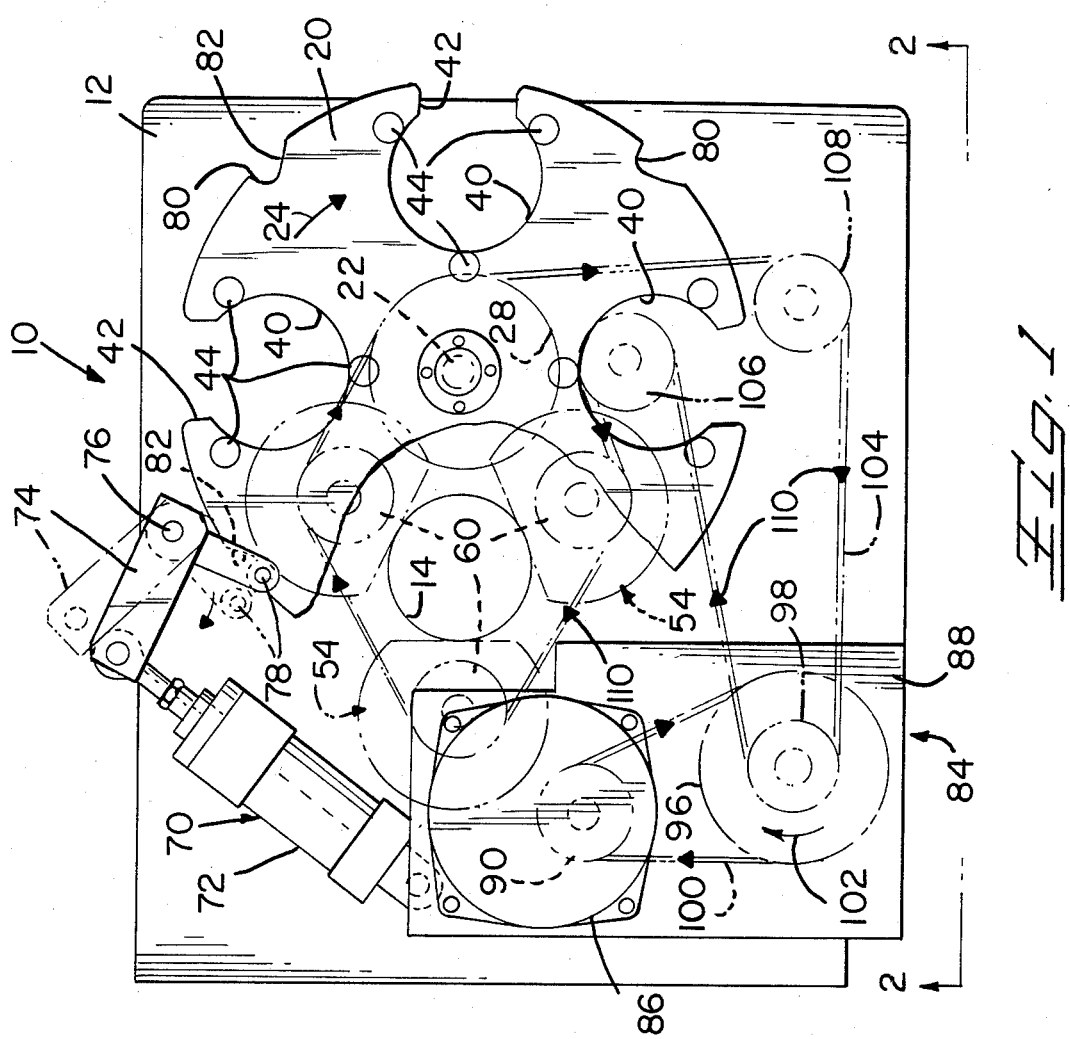
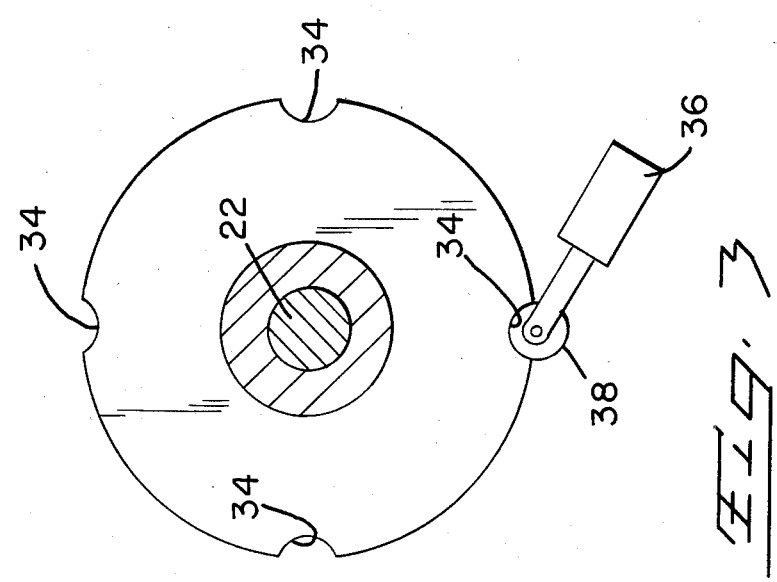

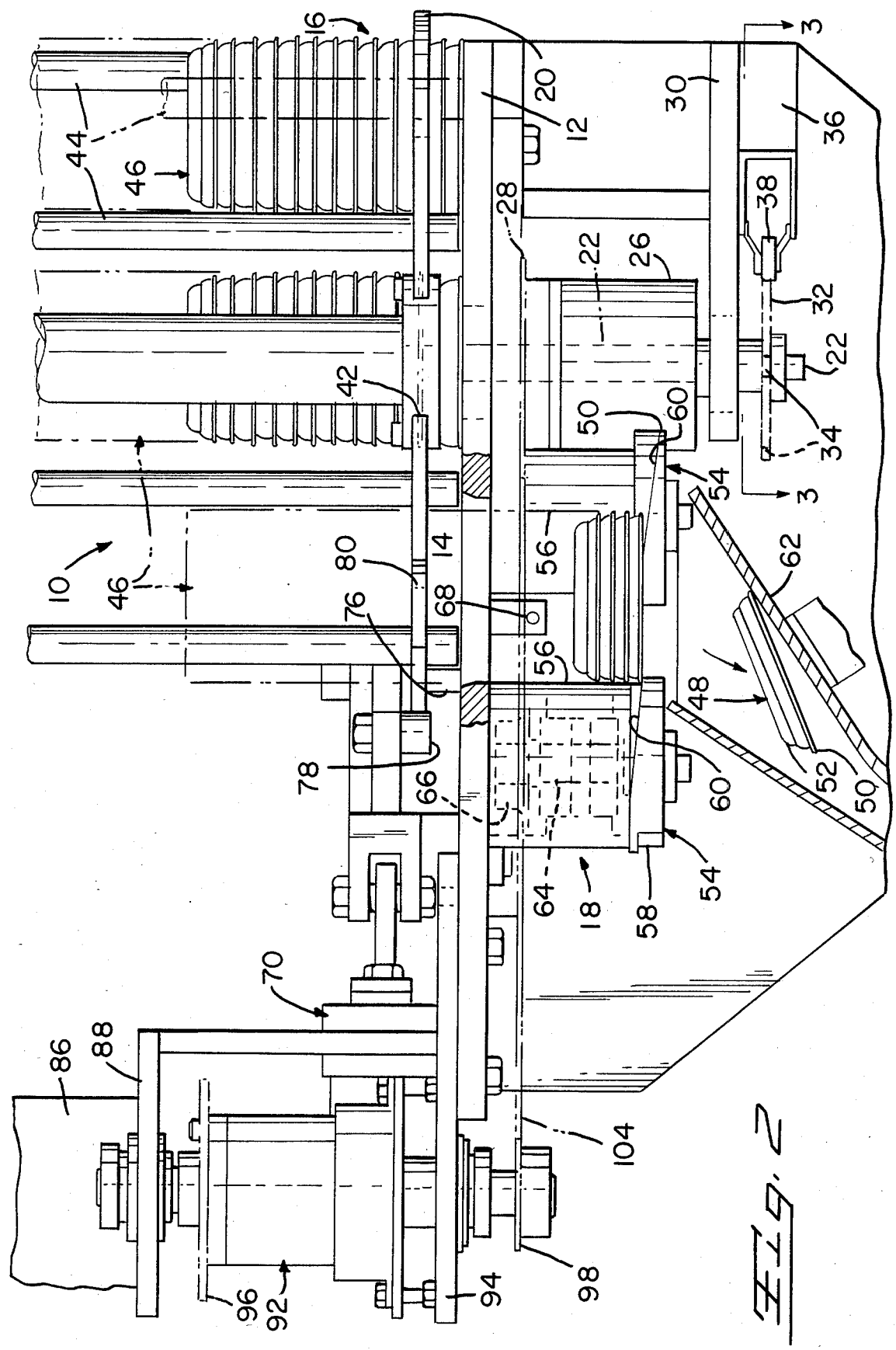

CAROUSEL TYPE DISPENSER

The invention relates to an improved carousel type dispenser for delivering individual thin plastic caps on demand from cap stacks.

The cap dispenser includes a carousel cap magazine loaded with a series of cap stacks which are progressively rotated over a drop hole and fall through the hole into a cap discharge assembly. On demand, rotary feeders in the assembly strip the lowermost cap from the stack for discharge while retaining remainder of the stack. After sufficient caps have been discharged to lower the stack below the magazine, feeding of the next cap automatically rotates the carousel magazine to deliver another cap stack to the discharge assembly. Further, cap stacks may be loaded into the magazine by an operator to renew the cap supply for continued operation.

Carousel type cup dispensers are shown in U.S. Pat. Nos. 2,925,196, 3,283,951, 3,807,600 and 4,351,452. These dispensers teach it is old to index a carousel magazine to resupply cup stacks to discharge assembly having rotary members for discharge of the lowermost cup on demand.

The disclosed carousel type dispenser includes an improved chain drive including a constantly running drive motor, a one revolution clutch connecting the motor to a drive gear for a single chain which extends around three like gears connected to the rotary disks of the cap discharge assembly and around a larger magazine input gear connected to the magazine through a selectively actuable magazine clutch. Actuation of the one revolution clutch drives the chain to rotate the disks and dispense a cap. The magazine clutch is disengaged during normal dispensing of individual caps.

When the cap stack in the discharge assembly lowers sufficiently to generate a low level signal the magazine clutch is engaged so that when the next individual cap is dispensed the magazine input gear rotates the magazine to position a cap stack to fall into the discharge assembly thereby resupplying the assembly with caps.

The disclosed cap magazine carries four cap stacks which are spaced at 90 degrees around the support axis. The input sprocket gear which rotates the magazine has less than four times as many teeth as the teeth on the chain drive sprocket gear. For this reason, each revolution of the chain drive gear rotates the input gear through an angle greater than 90 degrees. In the disclosed dispenser, space limitations prevent use of an input sprocket gear having four times the number of teeth of the drive gear.

The dispenser includes an alignment unit having a roller which is moved into an appropriate alignment recess in the circumference of the magazine to assure the magazine rotates only 90° during each revolution of the chain drive gear. Rotation of the input sprocket gear beyond 90 degrees overrides the magazine clutch.

The single chain drive provides a simple and reliable drive for dispensing caps on demand and indexing the carousel magazine to resupply caps when required. This type of drive is particularly well suited for continuous, uninterrupted production line use.

Other objects and features of the invention will become apparent as the description proceeds, especially when taken in conjunction with the accompanying drawings illustrating the invention, of where there are two sheets and one embodiment.

In the Drawings:

FIG. 1 is a top view of a carousel type dispenser according to the invention;

FIG. 2 is a side view, partially broken away, taken generally along line 2—2 of FIG. 1; and FIG. 3 is a view taken along line 3—3 of FIG. 2.

DESCRIPTION OF CAROUSEL-TYPE DISPENSER

Dispenser 10 includes a horizontal support plate 12 having a cap discharge hole 14 formed to the center thereof with a rotary carousel cap magazine 16 mounted above the plate for discharging stacks of caps through the hole 14 to cap discharge assembly 18 mounted on the bottom of the plate 12 below hole 14. The magazine 16 includes a circular base plate 20 mounted on a vertical shaft 22 which extends a distance below the plate 12 and is journalled in bearings carried by the plate to permit rotation of the magazine in the direction of arrow 24 as shown in FIG. 1. A pneumatic clutch 26 is mounted below plate 12 on the lower end of shaft 22 and includes a magazine input sprocket gear 28 such that when the clutch is engaged rotation of the gear 28 rotates the magazine 16.

The lower end of shaft 22 is journalled in a bearing carried on support bracket 30 below the clutch 26. The free end of the shaft extends below the bracket and carries a circular cam disk 32 provided with four 90° spaced circumferential recesses 34 as shown in FIG. 3. A microswitch 36 mounted on bracket 30 includes a trigger 38 normally resting on the circumference of disk 32. Rotation of the magazine 16 to the position of FIG. 3 allows the trigger to fall into a recess 34 and close microswitch 36. Continued rotation of magazine moves the trigger back to the circumference of the disk thereby opening the microswitch.

The carousel dispenser base plate 20 is provided with four cap stack holes 40 spaced at 90 degrees around the plate. Openings 42 may be provided in the holes at the circumference of plate 20. A series of three stack alignment posts 44 surround and extend slightly into each hole 40 to align cap stacks 46 which are positioned in the holes, rest on the upper surface of plate 12 and extend upwardly above the circular carousel plate 20. The spacing between the posts 44 at each opening is slightly greater than the exterior dimensions of stacks 46 to facilitate easy loading of stacks in the magazine and lowering of individual stacks through the discharge hole as individual caps fall into the discharge assembly and are dispensed from the bottom of the stack.

The stacks are formed from a series of thin plastic caps 48 each having a lower circumferential lip 50 and a cylindrical body 52. See FIG. 2. The caps are nested together in stacks 46 with the lips on the bottom of the caps and the cap bodies extending upwardly into the hollow interior of the next cap.

The cap discharge assembly 18 includes three like rotary cap feeders 54 mounted on the underside of plate 12 and surrounding the discharge hole 14 as indicated in FIG. 1. Each feeder 54 has an exterior guide surface 56 forming an extension of hole 14 below plate 12 and ending at a lower rotary disk 58 each having a screw surface 60 extending into the space below hole 14 for supporting a cap stack which has fallen down through the hole. Upon 360° rotation of all three disks, the lower most cap in the stack is separated from the stack and discharged into a gravity chute 62 located beneath the assembly. Each cap feeder 54 includes a vertical shaft 64 secured to the feeder by a suitable bearing with the rotary disk 58 secured to the bottom of the shaft and a sprocket gear 66 secured to the top of the shaft adjacent the lower surface of plate 12.

A light source (not illustrated) is mounted on undersurface of plate 12 to one side of the hole 14 and is aimed across the hole to a photocell receptor 68 mounted on the undersurface of plate 12 on the opposite side of the hole. When a full height cap stack 46 falls through hole 14 and onto the surfaces 60 the stack prevents light from striking the photo receptor 68. As caps are dispensed the height of the stack is reduced until finally the uppermost cap falls below the photo receptor and light is transmitted across the hole to activate the receptor to generate a signal indicating the reduced height of the stack.

The dispenser 10 includes an alignment unit 70 shown in FIG. 1 including an air cylinder 72 having one end fixed on plate 12 and a piston rod 74 at the other end secured to one leg of L-shaped pivot arm 74. The arm is rotatably mounted on a shaft 76 extending vertically above plate 12 to one side of the carousel base plate 20. An alignment roller 78 is provided on the other end of arm 74 such that retraction of the cylinder 70 as shown in solid lines in FIG. 1 forces the roller 78 toward the plate and extension of the air cylinder retracts the roller away from the plate as shown in dotted lines.

The plate is provided with four 90° spaced alignment recesses 80 each located on the circumference of the plate such that when the cylinder 72 is retracted and the roll 78 lies in the bottom of a recess the plate is angularly oriented with one of the cap stack holes 40 located directly above the cap discharge hole 14 in plate 12 to permit a cap stack 46 positioned in the hole 40 to fall through the plate 12 and onto the remaining caps of the reduced stack supported by screw surfaces 60. The recesses 80 are provided with lead in surfaces 82 on their lead sides to permit alignment of the magazine by roller 78.

Chain drive assembly 84 includes a drive motor 86 mounted on plate 88 above plate 12 having a drive sprocket gear 90 located below the plate 88. A one revolution clutch 92 is mounted between plate 88 and a plate 94 supported by plate 12 and includes an input sprocket gear 96 adjacent gear 90 and an output sprocket gear 98 located below plate 12. Chain 100 joins gears 90 and 96 as illustrated in FIG. 1 so that the motor 86 continuously rotates gear 96 in the direction of arrow 102.

Sprocket gears 28, 66 and 98 are all located the same distance below plate 12. Gears 66 and 98 are alike with the same number of teeth and diameter. Gear 28 is larger than gears 66 and 98 and preferably has four times as many teeth as each of the other gears. In disclosed dispenser 10 space constraints require use of a gear 28 having less than four times the teeth of gears 66 and 98. It is contemplated dispenser 10 may use either size gear 28.

The output sprocket gear 98 of clutch 92 is connected to the sprocket gears 66 of cap feeders 54 and to the sprocket magazine gear 28 on shaft 22 by a single drive chain 104. Chain 104 extends downstream from gear 98, around idler sprocket gear 106, the three cap feeder sprocket gears 66, the magazine input gear 28 and a second idler sprocket gear 108 and then back to the output sprocket gear 98. The position of sprocket gear 108 on the lower surface of plate 12 is adjustable to permit adjustment of the tension in chain 104. Upon engagement of clutch 92 motor 86 moves chain 104 in the direction indicated by arrows 110 during the revolution of gear 98.

Operation of Carousel-Type Dispenser

Carousel type cap dispenser 10 discharges individual caps 48 into chute 62 on demand. The caps fall down the chute for subsequent attachment to the end of a roll. The operations performed on the caps following discharge from the dispenser form no part of the present invention.

During operation of dispenser 10, motor 86 is powered to continuously rotate clutch input gear 96. A cap stack 46 is positioned on the screw surfaces 60 of disks 58 and extends upwardly above the photo receptor 68 so that light from the source does not strike the receptor. The carousel magazine 16 is positioned as shown in FIG. 1 with a cap stack hole 40 aligned above discharge hole 14. Additional cap stacks are positioned in the remaining three holes 14 with the lowermost caps resting on the plate 12 and the stacks extending upwardly from the base plate 20 between the alignment posts 44. One revolution clutch 92 is disengaged so that output gear 98 is not rotated and the pneumatic clutch 26 is disengaged so that the magazine input gear 28 is free to rotate independently of shaft 22 and magazine 16. Air cylinder 70 is retracted and the alignment roller 78 is seated within an alignment recess 80 to assure proper angular orientation of the magazine.

The dispenser 10 includes a control circuit (not illustrated) which actuates the various electrical and pneumatic elements of the dispenser in proper timed sequence for discharge of individual caps into the chute and resupply of cap stacks to the discharge assembly.

When the dispenser receives an input signal indicating a cap is to be discharged into chute 62 the control circuit engages one revolution clutch 92 so that the output gear 98 is rotated through one full revolution to drive chain 104 in the direction of arrows 110, rotate the three cap feeder sprocket gears 66 through one full revolution and rotate the magazine gear 28 through an angle equal to or greater than 90°, depending upon whether gear 28 has a number of teeth equal to or less than four times the number of teeth on gear 98. The carousel magazine 16 does not rotate.

Rotary disks 58 are rotated through one full revolution with gears 66 to discharge the lower most cap 48 from the supported cap stack into chute 62 while supporting the remaining cap stack as shown in FIG. 2. After drive gear 98 has been rotated a full revolution clutch 92 automatically disengages to complete the dispensing cycle.

The dispenser continues to discharge caps into chute 62 on demand as described above until the caps stack supported by disks 58 lowers below the light source and no longer shields the photo receptor. Light striking the receptor generates a signal to the control circuit so that when the next cap feed signal is received the one revolution clutch 92 is engaged and the air cylinder 70 is extended to free the carousel magazine 16 for rotation. The receptor signal also actuates the control circuit to supply pressurized air to pneumatic clutch 26 to engage the clutch and form a drive connection between gear 28 and shaft 22 thereby rotating the carousel magazine 16 in the direction of arrow 24 in response to movement of chain 104.

In the event gear 28 has four times the number of teeth of gear 98 clutch 26 is engaged when clutch 92 is engaged to assure that the carousel magazine is rotated 90° during the single revolution of gear 98. In the event the gear 28 has fewer teeth than gear 98 engagement of clutch 26 may be delayed for a short interval until after engagement of clutch 92 so that clutch 26 engages after chain 104 has been moved a short distance. The remaining movement of the chain rotates the magazine 90°. The delayed engagement of the clutch reduces starting load on drive motor 86.

In either event, when the carousel magazine 16 and shaft 22 have been rotated nearly 90° limit switch trigger 38 falls into a recess 34 on disk 32 to close the switch and generate a signal to the control circuit to retract air cylinder 70, thereby moving the alignment roller 78 toward plate 20. The roller is moved into a recess 80 to assure that the magazine has been rotated through exactly 90 degrees so that the next cap stack 46 has been brought above discharge hole 14. Final movement of the magazine 16 may be made as roller 78 is forced down the lead in surface of the recess 80, particularly where gear 28 has fewer than four times the number of teeth of drive gear 98. The control circuit disengages pneumatic clutch 26 when the one revolution clutch 92 is disengaged following full rotation of drive gear 98.

Depending upon the length of chain 104 required to rotate the carousel magazine to 90° the alignment unit 70 may lock the magazine against further rotation before clutch 26 is disengaged so that the clutch is overridden for the remaining feed of the chain. The clutch 26 has a light engagement to permit this slippage prior to disengagement of the clutch. The light clutch engagement between gear 28 and shaft 22 adds to the safe operation of the dispenser by permitting an operator to rotate the magazine or hold the magazine against rotation when the clutch is engaged and the alignment unit 70 is disengaged.

Indexing of magazine 16 slides the supported cap stacks along the top of plate 12 to position the lead stack over hole 14 so that the stack falls down through the hole an onto the top of the remaining caps supported by rotary disks 58. The dispenser continues to operate discharging caps on demand until the stack supported by the disks again lowers sufficiently to permit light to strike the photo receptor 68 at which time the dispenser automatically indexes the magazine another 90° to resupply caps to the cap discharge assembly 18. An operator manually loads cap stacks 46 between the posts 44 so that the stacks rest on the top of plate 12 for subsequent indexing to hole 14 and discharge by cap dispenser 18.

The carousel magazine and dispenser 10 ten is provided with holes 40 and posts 44 for supplying four 90° spaced cap stacks and the magazine is indexed 90° in order to replenish the cap discharge assembly 18. While it is contemplated that dispensers using similar cap discharge assemblies and chain drive assemblies may include magazines carrying more or fewer cap stacks, the disclosed four stack magazine is particularly well suited for use with the disclosed chain drive. Magazines carrying two or three stacks have limited capacity and require frequent re-supply. Magazines carrying five or more stacks have a relatively large diameter and require a considerably larger drive gear to assure rotation through an angle which decreases as the number of stacks carried by the magazine increases.

As shown in FIG. 1, two of the three rotary cap feeders 54 are located under magazine 16, adjacent to clutch 26 and to either side of a plane perpendicular to plate 12 extending through the rotary axis of the magazine and the center of discharge hole 14. This compact arrangement permits use of a three cap feeder discharge assembly with a relatively small diameter magazine and an axially mounted magazine clutch.

While I have illustrated and described a preferred embodiment of my invention, it is understood that this is capable of modification, and I therefore do not wish to be limited to the precise details set forth, but desire to avail myself of such changes and alterations as fall within the purview of the following claims.

What I claim my invention is:

1. A machine for dispensing caps or the like comprising a support plate having a smooth upper surface and a discharge hole extending through the plate at the surface, a carousel magazine rotatably mounted on the top of the plate over the hole including means for supporting a number of circumferentially spaced cap stacks for sliding movement over such surface with rotation of the magazine, and a magazine gear rotatably mounted below the plate; a magazine clutch forming a drive connection between the magazine gear and the magazine so that when the clutch is engaged rotation of the magazine gear rotates the magazine; a cap discharge assembly mounted below the plate under the hole for supporting cap stacks falling down the hole from the magazine including at least one rotary cap dispensing disk for dispensing individual caps from a cap stack and a disk drive gear connected to rotate the disk; a drive assembly including a drive motor, an output gear rotatably mounted below the plate, a chain drive clutch forming a drive connection between the drive motor and the output gear so that when the drive clutch is engaged the motor rotates the output gear, and a drive chain under the plate extending around all of said gears whereby rotation of said output gear drives the chain to rotate said disk drive gear and said magazine gear; a sensor for generating a low level signal when the height of a cap stack in the cap discharge assembly falls to a level below the plate; and a control circuit operable in response to an input signal to engage the chain drive clutch without engaging the magazine clutch to thereby rotate the output gear, move the chain and rotate the dispensing disk sufficently to discharge a cap from the discharge assembly without rotating the magazine, said control circuit including means for engaging said magazine clutch upon receipt of a low level signal from the sensor so that when the chain drive clutch is next engaged in response to an input signal the cap discharge assembly discharges a cap as before and the magazine is rotated to position a cap stack to fall down the hole to resupply the discharge assembly.

2. A machine as in claim 1 including means for maintaining engagement of the chain drive clutch to rotate the output gear through an angle sufficient to rotate the dispensing disk to discharge a cap and, upon engagement of the magazine clutch, to rotate the magazine without slippage through an angle not less than the angle between adjacent cap stacks in the magazine, and including an alignment unit engabable with the magazine to prevent rotation of the magazine through an angle greater than said angle.

3. A machine as in claim 2 wherein said chain drive clutch automatically disengages after one revolution of the output gear, the output gear rotates the cap dispensing disk one revolution to discharge a cap, and the number of teeth on the magazine gear is equal to or slightly less than the number of teeth on the output gear multiplied by the number of spaced cap stacks supported by the magazine.

4. A machine as in claim 1 wherein the cap discharge assembly includes three like cap dispensing disks and disk drive gears spaced around said hole and the chain extends around all of the said gears, the carousel magazine includes a shaft extending below the plate, the magazine clutch and magazine gear surround said shaft, said chain drive clutch having an engagement of sufficient duration to drive the output gear to rotate said disk drive gears through a full revolution for discharging a cap, two of said cap dispensing disks being located beneath the magazine and on opposite sides of a plane perpendicular to the plate and extending between the axis of rotation of the carousel and the center of the hole.

5. A machine as in claim 4 wherein the drive clutch rotates the output gear through a full revolution, the output gear and the disk drive gears have the same number of teeth and the magazine gear has a number of teeth equal to or slightly less than the number of teeth on the output gear multiplied by the number of spaced cap stacks supported by the magazine.

6. A machine as in claim 5 including an alignment unit engagable with the magazine to prevent rotation of the magazine through an angle greater than the angle between adjacent cap stacks in the magazine.

7. A machine as in claim 6 wherein said magazine includes means for supporting four cap stacks.

8. A machine for dispensing caps or the like comprising a support plate having a discharge hole extending through the plate, a magazine movably mounted on the top of the plate over the hole including means for supporting a number of cap stacks for discharge through the hole and a magazine gear rotatably mounted below the plate; a magazine clutch forming a drive connection between the magazine gear and the magazine so that when the clutch is engaged rotation of the magazine gear moves the magazine; a cap discharge assembly mounted below the plate under the hole for supporting cap stacks falling down the hole from the magazine including at least one rotary cap dispensing disk for dispensing individual caps from a cap stack and a disk drive gear connected to rotate the disk; a drive assembly including a drive motor, an output gear rotatably mounted below the plate, a chain drive clutch forming a drive connection between the drive motor and the output gear so that when the drive clutch is engaged the motor rotates the output gear, and a drive chain under the plate extending around all of said gears whereby rotation of said output gear drives the chain to rotate said disk drive gear and said magazine gear; a sensor for generating a low level signal when the height of a cap stack in the cap discharge assembly falls to a level below the plate; and a control circuit operable in response to an input signal to engage the chain drive clutch without engaging the magazine clutch to thereby rotate the output gear, move the chain and rotate the dispensing disk sufficently to discharge a cap from the discharge assembly without moving the magazine, said control circuit including means for engaging said magazine clutch upon receipt of a low level signal from the sensor so that when the chain drive clutch is next engaged in response to an input signal the cap discharge assembly discharges a cap as before and the magazine is moved to position a cap stack to fall down the hole to resupply the discharge assembly.

* * * * *